United States Patent Office 3,728,316
Patented Apr. 17, 1973

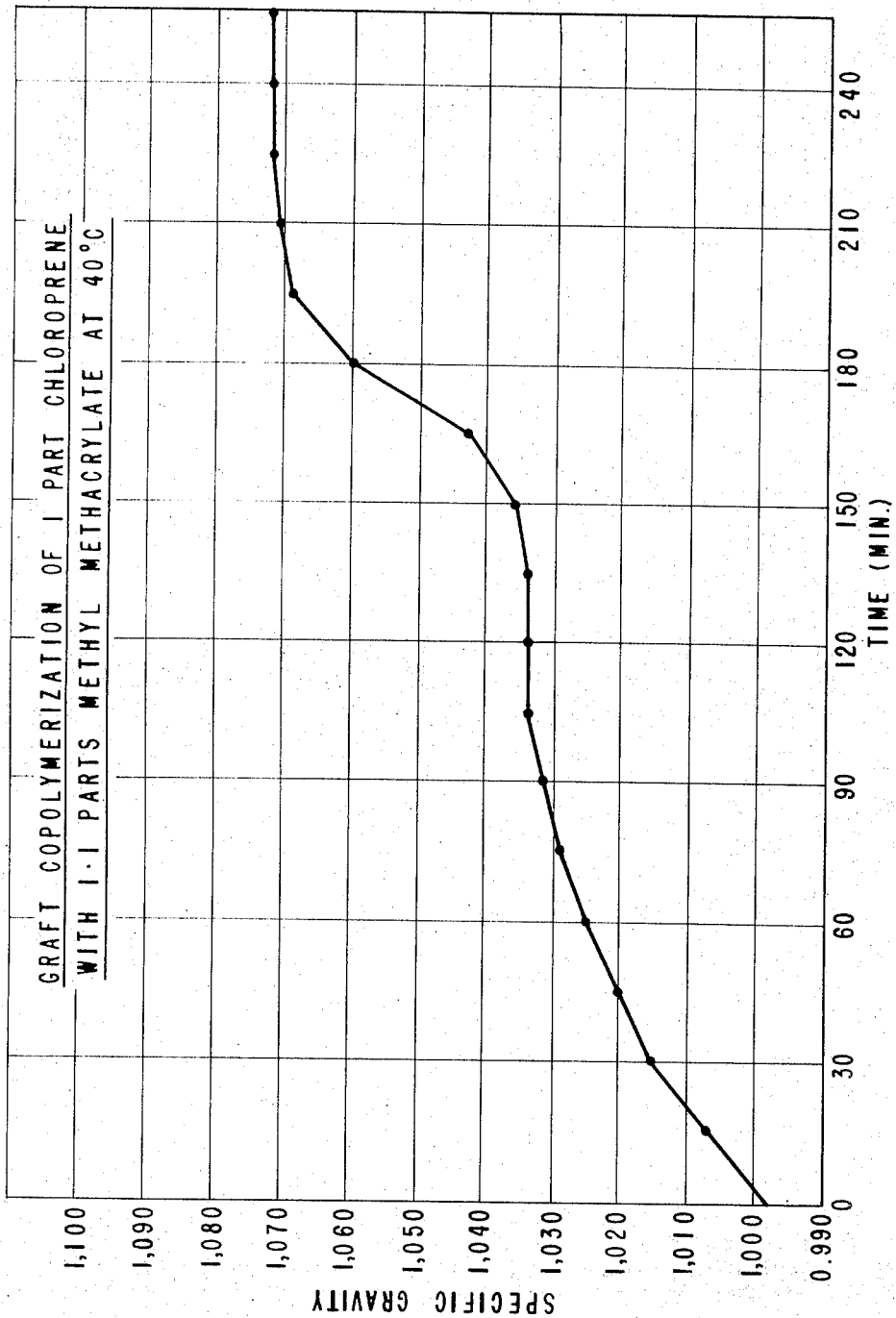

3,728,316
CHLORO-1,3-BUTADIENE/α-ALKYL ACRYLATE ESTER-GRAFTED COPOLYMERS
Donald Max Simons, Wilmington, Del., assignor to E. I. du Pont de Nemours and Company, Wilmington, Del.
Continuation-in-part of application Ser. No. 836,376, June 25, 1969. This application Nov. 16, 1970, Ser. No. 90,112
Int. Cl. C08f 15/26
U.S. Cl. 260—80.77          14 Claims

ABSTRACT OF THE DISCLOSURE

Lower alkyl and cycloalkyl esters of unbranched α-$C_1$–$C_4$ alkylacrylates copolymerize in emulsion with 2-chloro-1,3-butadienes until all the latter monomer is exhausted, then graft onto the copolymer backbone so-formed. The reaction proceeds in two distinct steps, the grafting step requiring the presence of a polymerization catalyst, an anionic surfactant, and at least one cation of the group: triethanolammonium, tri(2-propanol)ammonium, diethanol-ammonium, and $C_1$–$C_3$ alkyldiethanol-ammonium. Novel grafted copolymers of 2-chloro-1,3-butadienes produced by this process range from rubbery to plastic materials. Grafted copolymers of 2-chloro-1,3-butadienes with methyl methacrylate are excellent adhesives for plasticized polyvinyl chloride.

CROSS-REFERENCE TO RELATED APPLICATION

This application is a continuation-in-part of my prior United States application Ser. No. 836,376 filed June 25, 1969, now abandoned.

BACKGROUND OF THE INVENTION

This invention relates to novel and useful copolymers of 2-chloro-1,3-butadienes with alkyl and cycloalkyl esters of unbranched α-($C_1$–$C_4$)-alkylacrylates and to methods for their manufacture. For purposes of this disclosure chloroprene (2-chloro-1,3-butadiene) and 2,3-dichloro-1,3-butadiene are referred to generically as 2-chloro-1,3-butadiene.

It is known to copolymerize 2-chloro-1,3-butadiene (chloroprene) with other monomers, which include for example acrylic esters. Such copolymers are believed to have both the 2-chloro-1,3-butadiene units and the comonomer units incorporated into the copolymer backbone.

It is desirable for certain applications, such as for example adhesives, to prepare copolymers in which some polar comonomer units are incorporated into the copolymeric backbone while additional units are grafted onto it. However, such copolymers of 2-chloro-1,3-butadienes with grafted side chains were not known heretofore. The term "grafted copolymer," as used in this application, means a copolymer in which some units of one of the comonomers are incorporated into the copolymeric backbone while other units of the same comonomer are grafted onto it.

SUMMARY OF THE INVENTION

According to this invention, grafted copolymers of 2-chloro-1,3-butadienes are obtained by emulsion copolymerization of a 2-chloro-1,3-butadiene with at least one comonomer of the formula

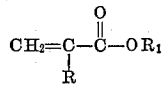

where R is an unbranched alkyl radical having 1–4 carbon atoms and $R_1$ is an alkyl or a cycloalkyl radical having 1–12 carbon atoms. Such monomers are hereinafter sometimes referred to as "formula monomers" for convenience.

It is necessary, for satisfactory reaction rates and consequently high grafted copolymer yields, to carry out the copolymerization in the presence of an anionic surfactant and of at least one of the following cations:

(a) triethanolammonium $(HOCH_2CH_2)_3\overset{+}{N}H$;

(b) tri(2-propanol)ammonium $\left(\underset{CH_3\overset{|}{C}HCH_2}{\overset{OH}{|}}\right)_3\overset{+}{N}H$;

(c) diethanolammonium $(HOCH_2CH_2)_2\overset{+}{N}H_2$; or (d) alkyldiethanolammonium $(HOCH_2CH_2)_2\overset{+}{\underset{R'}{N}}H$ where R' is an alkyl radical having 1–3 carbon atoms. Such a cation usually is introduced as part of the surfactant used for emulsification, for example as triethanolammonium dodecylbenzenesulfonate; but it also can be added as a salt of a conventional acid, for example as triethanolammonium chloride.

The reaction is carried out in the presence of a polymerization catalyst, preferably based on a redox pair.

While the ratio of the 2-chloro-1,3-butadiene to the α-alkylacrylate esters can be varied within a broad range, grafted copolymers having about 30–80% of a 2-chloro-1,3-butadiene and 70–20% of methyl methacrylate are very useful in adhesive compositions for polyvinyl chloride articles, for example in laminating polyvinyl chloride sheets to steel and other metals.

Drawing

The drawing is a plot of specific gravity of an emulsion of 1 part by weight of chloroprene and 1.1 parts by weight of mehylmethacrylate at 40° C. versus time from the beginning of polymerization. Two distinct stages can be observed, the dividing line corresponding to a density of approximately 1.034 (and time about 120 minutes).

DETAILED DESCRIPTION OF THE INVENTION

Two stages observed during the emulsion copolymerization of 2-chloro-1,3-butadienes with an α-alkylacrylate ester according to the present process suggest a two-step reaction. In the first step, a copolymer of 2-chloro-1,3-butadiene or 2,3-dichloro-1,3-butadiene with the acrylic comonomer is believed to be formed. This step is insensitive to the nature of the surface active agent and proceeds at a fairly constant rate until substantially all the 2-chloro-1,3-butadiene has been used up. In the second step, free acrylic comonomer grafts onto the copolymer backbone formed in the first step until all the acrylic comonomer is used up. This second step is very sensitive to the nature of the surface active agent used in the preparation of the emulsion.

Progress of the reaction can be followed by any suitable technique known in the art for the study of polymerization kinetics. It has been found that determination of the specific gravity of the emulsion is a convenient tool for studying each polymerization step. Thus, during Stage I the density of the emulsion gradually increases with time until it reaches a plateau. It can be shown by analysis that substantially all of the initially present chloroprene and/or 2,3-dichloro-1,3-butadiene is, at the end of Stage I, copolymerized with a portion of the acrylate comonomer.

Grafting is believed to take place during Stage II. During this period the emulsion density increases at a fast rate until it eventually reaches a plateau when the α-alkylacrylate ester monomer is exhausted. The overall conversion thus is virtually quantitative.

Preferred alkyl and cycloalkyl α-alkylacrylate esters are methacrylates, which are inexpensive and readily available. However, α-ethylacrylate esters, normal α-propylacrylate esters, and normal α-butylacrylate esters also can be used. Representative alkyl and cycloalkyl radicals $R_1$ in Formula I representing suitable α-alkylacrylates include methyl, ethyl, propyl, isopropyl, butyl, hexyl, nonyl, decyl, cyclopentyl, cyclohexyl, cycloheptyl, and cyclooctyl. The preferred acrylic ester is methyl methacrylate. Mixtures of two or more acrylic esters differing in their R or $R_1$ groups can be used. Although alkyl acrylates (i.e. alkyl esters of unsubstituted acrylic acid) are not suitable comonomers in the process of this invention, a mixture of an acrylate and an α-alkylacrylate can be used. The reaction rate with such a mixture is slower than the reaction rate with an α-alkylacrylate ester alone, but a quantitative yield of a graft copolymer can be obtained.

The 2-chloro-1,3-butadiene can be either chloroprene (2-chloro-1,3-butadiene), or 2,3-dichloro-1,3-butadiene, or a mixture of them. The presence of the dichloro monomer is sometimes advantageous even when the chloroprene is the principal monomer of this class.

Although the initial ratio of chloroprene or 2,3-dichloro-1,3-butadiene to the acrylic monomer can be varied quite widely, it has been found that a certain minimum amount of the acrylic monomer must be present in order to obtain both copolymerization and grafting. For methyl methacrylate this minimum amount is about 10% by weight of the starting 2-chloro-1,3-butadiene and generally it is less than about 15%. The acrylic monomer unit content of the final copolymer obtained is from 15 to 80% by weight, but except as determined by this requirement, there is no upper limit on the proportion of acrylic comonomer at the start of the polymerization.

When small amounts of the acrylic monomer are used, the graft copolymer product is quite elastomeric. With methyl methacrylate as the monomer, useful adhesives for plasticized polyvinyl chloride articles are obtained within the 2-chloro-1,3-butadiene/methyl methacrylate weight ratio of about 4:1 to 1:1. As the concentration of the acrylate increases, the resulting copolymers gradually lose their elastomeric properties and become more plastic. Rubbery grafted copolymers obtained with alkyl and cycloalkyl α-alkylacrylates are resistant to ozone and to chemicals and should find application in adhesives, in making molded and extruded articles, such as gaskets, and in coating electric wires.

A chain transfer agent usually is present in the polymerization medium. The purpose of this additive is to prevent formation of copolymers of very high molecular weight, which tend to be crosslinked and insoluble. Any mercaptan is a suitable transfer agent, but dodecyl mercaptan is preferred because of its low volatility and consequently lack of a strong offensive odor. Higher mercaptans, such as hexadecyl and octadecyl mercaptans, can be used instead of dodecyl mercaptan. Iodoform, a known chain transfer agent, also can be used. Certain other compounds known in the polymer art as effective chain transfer agents, such as dialkylxanthogen disulfides, or iodine, are unsuitable because they extend reaction times beyond practical limits.

The reaction is carried out in the presence of a polymerization catalyst. Although many free-radical generating catalysts are effective in promoting the polymerization of chloroprene, it has been found that the present copolymerization is most effectively promoted by a redox system. Typical redox pairs which can be used in the present process include sodium sulfite/potassium persulfate, ammonium persulfate/sodium bisulfite, cumene hydroperoxide/sodium hydrosulfite, ammonium persulfate/sodium formaldehyde sulfoxylate, t.-butyl hydroperoxide/sodium formaldehyde sulfoxylate, and potassium persulfate/sodium metabisulfite.

The polymerization reaction is usually run at atmospheric pressure and at a temperature of about 10–60° C. Below about 10° C. the reaction rates are somewhat too slow to be practical. Above 60° C. there is a risk of volatilization of the 2-chloro-1,3-butadiene. It is also possible to run each reaction stage at a different temperature, maintaining a temperature of not over 60° C. during the copolymerization step and increasing the temperature to about 100° C. during the grafting step.

It has been found that grafting is accomplished very effectively when the emulsion is prepared in the presence of at least one anionic surface active agent whose cation has one of the following structures: triethanolammonium, tri(2-propanol)ammonium, diethanolammonium and a $C_1$–$C_3$ alkyldiethanolammonium. The anions of such surfactants preferably are derived from strong acids, such as organic sulfonic acids, acid sulfate esters, and acid phosphate esters. Examples of suitable strong acids include dodecylbenzenesulfonic acid, decylbenzenesulfonic acid, monododecyl sulfate (known as "lauryl acid sulfate"), and acid phosphate esters of alkylphenol condensation products with ethylene oxide (for example Triton QS–30 and Triton QS–44; Rohm & Haas Co.).

Instead of using a surface active agent containing one of the suitable cations, it is possible to use any other anionic surfactant and add one or more suitable cations in the form of their salts with conventional acids. These acids can be strong inorganic acids, such as for example sulfuric, hydrochloric and phosphoric; or lower organic acids, such as acetic, propionic or butyric. It is believed that, when such a two-component system is used, an "active" detergent containing one of the above-mentioned cations is formed in situ.

The amount of "active" detergent which is present in the graft copolymerization is about 0.5–10, preferably 1–5, parts by weight per 100 parts of monomers. If too little detergent is present, undesirable coagulation of copolymer can occur; if too much is present, the initial reaction rate is increased, and the viscosity of the emulsion becomes too high for a practical operation.

The reaction is carried out in an inert atmosphere, preferably under a nitrogen blanket. A 2-chloro-1,3-butadiene, an alkyl or cycloalkyl α-alkylacrylate ester, and a chain transfer agent are emulsified, usually also with the reducing agent of the redox catalyst system. As the initial exothermic reaction subsides, the oxidizing agent of the redox catalyst system is added gradually until the emulsion density reaches a constant value. Alternatively, the oxidizing agent can be added as the makeup stage, and the reducing agent can be added portionwise as polymerization progresses. The polymer can be isolated by any known technique, for example by coagulation with methanol or with aqueous solutions of inorganic salts (such as sodium chloride) or by drum-drying. Copolymers of sufficiently low acrylate content that they are rubbery may be isolated by a freeze roll.

Instead of adding all of the acrylic monomer at the beginning of the polymerization reaction, it is possible to add part of the monomer at the beginning and the remainder at the end of Stage I. Although the final composition of the copolymeric product will be the same in both cases, i.e. the proportions of chloroprene and of the acrylic comonomer will not change, the distribution of grafted and copolymerized acrylic comonomer will be different. When the acrylic comonomer is added to the mixture in two portions, the first portion copolymerizes in part (until chloroprene is completely used up) and grafts in part. The second portion grafts but no longer compolymerizes. Consequently, a larger proportion of the comonomer is grafted in this manner than is possible when all of the monomer is added at the beginning of the reaction.

Instead of adding the catalyst components at two different stages, both of them could be added either at once or gradually at the same time. The preferred technique, described above, permits a good control of the reaction rate and consequently also of the reaction temperature.

These and other variations can be readily perceived by one skilled in the art and advantageously applied by him to suit his particular needs.

Grafted copolymers prepared by the process of the present invention are soluble in aromatic hydrocarbons; certain chlorinated hydrocarbons, such as carbon tetrachloride and orthodichlorobenzene, but not perchloroethylene; and certain organic mixtures, such as toluene/methyl acetate and acetone/hexane. They are dispersible in ketones, such as methyl ethyl ketone and acetone, with formation of organosols. Grafted copolymers which contain about 50–80% by weight 2-chloro-1,3-butadiene units and 50–20% by weight methyl methacrylate comonomer units are useful adhesives for plasticized polyvinyl chloride. In particular, they are excellent vinyl-to-steel adhesives and in general vinyl-to-metal adhesives. These new graft copolymers are attacked slightly or not at all by dioctyl phthalate, which is the most commonly used plasticizer for polyvinyl chloride, and therefore are particularly suitable for such applications. They should be especially useful in the manufacture of plasticized polyvinyl chloride/steel laminates.

The invention is now illustrated by examples of certain preferred embodiments thereof. All parts, percentages, and proportions, both in the examples and in the adhesion testing data are by weight unless otherwise indicated.

EXAMPLE 1

A chloroprene-methyl methacrylate copolymer grafted with poly(methyl methacrylate) side chains and containing an overall ratio of 2 parts chloroprene to 1 part methyl methacrylate is prepared as follows:

A mixture of 1000 grams of chloroprene, 500 grams of methyl methacrylate and 5.5 grams of dodecyl mercaptan is emulsified with a solution of 42 grams of triethanolammonium dodecylbenzenesulfonate and 4.5 grams of sodium sulfite in 1650 grams of water and stirred with good agitation in a flask under a nitrogen atmosphere. The temperature rises spontaneously and is maintained at approximately 40° C. throughout the polymerization. After noticeable evolution of heat subsides, 1.0 ml. of a 2% aqueous solution of potassium persulfate catalyst is added every 15 minutes, until the specific gravity as determined by hydrometer reaches a constant value of 1.091. At this point, both monomers are substantially exhausted by the polymerization reaction. Nineteen milliliters of the catalyst solution are required, and the total polymerization time is about 5 hours. The polymer, isolated by coagulation with methanol and drying, contains 26.3% chlorine (theory =26.6%.

EXAMPLE 2

A chloroprene-methyl methacrylate copolymer grafted with poly(methyl methacrylate) side chains and containing an overall ratio of 4 parts chloroprene to 1 part methyl methacrylate is prepared according to the procedure given in Example 1 by emulsifying 400 grams of chloroprene, 100 grams of methyl methacrylate and 1.9 grams of dodecyl mercaptan with a solution of 14 grams of triethanolammonium dodecylbenzenesulfonate and 1.5 grams of sodium sulfite in 550 grams of water. The polymerization time is about 6.5 hours; the final specific gravity is 1.095; and the catalyst requirement (2% potassium persulfate) is 14 ml. The polymer, isolated by coagulation with methanol and drying, contains 31.4% chlorine (theory=32.0%).

EXAMPLE 3

A chloroprene-methyl methacrylate copolymer grafted with poly(methyl methacrylate) side chains and containing an overall ratio of 1 part chloroprene to 2 parts methyl methacrylate is prepared according to the procedure given in Example 1 by emulsifying 334 grams of chloroprene, 666 grams of methyl methacrylate and 2 grams of dodecyl mercaptan with a solution of 34 grams of triethanolammonium dodecylbenzenesulfonate and 4 grams of sodium sulfite in 1724 grams of water. The polymerization time is 4 hours, the final gravity 1.068, and the solids content of the latex 37.4% (theory=37.6%).

EXAMPLE 4

A chloroprene-methyl methacrylate copolymer grafted with poly(methyl methacrylate) side chains and containing an overall ratio of 2 parts chloroprene to 1 part methyl methacrylate is prepared by the procedure of Example 1, but using different surfactants, as shown in Table I below. The amounts of ingredients are as follows:

| | Grams |
|---|---|
| Chloroprene | 334 |
| Methyl methacrylate | 166 |
| Dodecyl mercaptan | 1.5 |
| Water | 540 |
| Surfactant (amount of active ingredient) | 15 |
| Sodium sulfite | 1.5 |

TABLE I

| Surfactant | Polymerization time, m. | Catalyst [1] consumption, ml. | Final specific gravity | Percent Cl in polymer |
|---|---|---|---|---|
| (a) Triethanolammonium dodecylbenzenesulfonate | 290 | 7 | 1.091 | 26.2 |
| (b) Technical triethanolammonium lauryl sulfate | 210 | 7 | 1.091 | 26.6 |
| (c) Technical sodium lauryl sulfate plus triethanolammonium sulfate [2] | 210 | 7 | 1.090 | 27.0 |
| (d) Methyldiethanolammonium dodecylbenzenesulfonate | 300 | 10 | 1.091 | 26.5 |
| (e) Tripropanolammonium dodecylbenzenesulfonate | 300 | 10 | 1.090 | 26.5 |

[1] 2% aqueous potassium persulfate.
[2] In this case, 15 grams of sodium salt of lauryl acid sulfate is used plus a molar equivalent of triethanolammonium sulfate.

EXAMPLE 5

A chloroprene-isobutyl methacrylate copolymer grafted with poly(isobutyl methacrylate) side chains and containing a 1:1 ratio of chloroprene to isobutyl methacrylate is prepared using the procedure of Example 1 and the recipe below:

| | Grams |
|---|---|
| Chloroprene | 250 |
| Isobutyl methacrylate | 250 |
| Dodecyl mercaptan | 1.85 |
| Triethanolammonium dodecylbenzenesulfonate | 14.0 |
| Water | 760 |
| Sodium sulfite | 1.5 |

Two percent potassium persulfate is added in 0.5 ml. increments (8.5 mls. total). The final specific gravity is 1.045, obtained in a polymerization time of 300 minutes. The solids content is 40.4%.

EXAMPLE 6

Graft copolymers are prepared from equal weights of chloroprene and various alkyl methacrylate esters following the procedure of Example 1. The recipe is indicated below, and the final specific gravity is given in Table II. Two percent potassium persulfate is added in 0.5 ml. increments at 15 minute intervals throughout the polymerization after the initial liberation of heat subsides. The theoretical chlorine content of the polymer is 20% chlorine.

RECIPE

| | Grams |
|---|---|
| Chloroprene | 250 |
| Acrylic ester, cf. Table II | 250 |
| Dodecyl mercaptan | 1.85 |
| Water | 765 |
| Triethanolammonium dodecylbenzenesulfonate | 15 |
| Sodium sulfite | 1.5 |

Catalyst: Aqueous 2% potassium persulfate
Polymerization temperature: 40° C.

TABLE II

| Acrylic ester | Catalyst consumption, ml. | Polym. time, min. | Final specific gravity | Percent Cl in polymer |
|---|---|---|---|---|
| (a) Methyl methacrylate | 8.0 | 240 | 1.078 | 19.6 |
| (b) Ethyl methacrylate | 7.5 | 225 | 1.059 | 19.6 |
| (c) Propyl methacrylate | 10.0 | 300 | 1.053 | |
| (d) n-Butyl methacrylate | 11.0 | 390 | 1.044 | 20.8 |
| (e) iso-Butyl methacrylate | 8.5 | 300 | 1.045 | 19.8 |
| (f) 2-ethylhexyl methacrylate | 10.0 | 300 | 1.030 | 19.9 |
| (g) 50/50 methyl methacrylate n-butyl methacrylate | 8.0 | 240 | 1.060 | 19.6 |
| (h) 50/50 methyl methacrylate n-butyl acrylate | 13.0 | >500 | 1.057 | 19.9 |

EXAMPLE 7

A 2,3-dichloro-1,3-butadiene-methyl methacrylate copolymer grafted with poly (methyl methacrylate) side chains and containing an overall ratio of 1 part of 2,3-dichloro-1,3-butadiene to 1 part of methyl methacrylate is prepared according to the procedure given in Example 1 by emulsifying 500 grams of 2,3-dichloro-1,3-butadiene, 500 grams of methyl methacrylate and 4.65 grams of dodecyl mercaptan with a solution of 50 grams of triethanolammonium dodecylbenzenesulfonate (60% solution) and 5 grams of sodium sulfite in 2000 grams of water. The polymerization time is about 2 hours; the final specific gravity is 1.078; and the catalyst requirement (2% potassium persulfate, 0.2% 2-anthraquinone sodium sulfonate) is 20 to 25 ml. Chlorine content is 28.3%; theoretical chlorine content is 28.83%.

The polymer is insoluble at room temperature in toluene or a mixed solvent such as toluene/methyl ethyl ketone/hexane (1:1:1 by weight) but soluble in hot toluene (heated on the steam bath). The cast film from the toluene solution of this polymer shows high resistance to plasticizers (such as dioctyl phthalate).

EXAMPLE 8

A chloroprene/2,3 - dichloro - 1,3 - butadiene/methyl methacrylate terpolymer grafted with poly (methyl methacrylate) side chains and containing an overall ratio of 1 part of chloroprene to 2 parts of 2,3-dichloro-1,3-butadiene to 1 part of methyl methacrylate is prepared as follows:

A mixture of 250 grams of chloroprene, 500 grams of 2,3-dichloro-1,3-butadiene, 250 grams of methyl methacrylate and 4.65 grams of dodecyl mercaptan is emulsified with a solution of 50 grams of triethanolammonium dodecylsulfonate (60% solution) and 5 grams of sodium sulfite in 2000 grams of water and stirred with good agitation in a flask under a nitrogen atmosphere. The temperature rises spontaneously and is maintained at approximately 40° C. throughout the polymerization. After noticeable evolution of heat subsides, 2.0–7.0 ml. of an aqueous solution of catalysts comprising 2% of potassium persulfate and 0.2% of 2-anthraquinone sodium sulfonate is added every 15 minutes, until the specific gravity as determined by hydrometer reaches a constant value of 1.085 at 20°/4° C. At this point, the monomers are substantially exhausted by the polymerization reaction. Forty-five to fifty-five milliliters of the catalyst solution are required, and the total polymerization time is four hours. Chlorine analysis (Schoniger flask method) is 38.7%, vs. 38.7% theoretical.

EXAMPLE 9 acrylate) side chains and containing an overall ratio of 1 part chloroprene, 3 parts 2,3-dichloro-1,3-butadiene and 1 part of methyl methacrylate is prepared according to the procedure given in Example 1 by emulsifying 200 grams of chloroprene, 600 grams of 2,3-dichloro-1,3-butadiene, 200 grams of methyl methacrylate and 4.65 grams of dodecyl mercaptan with a solution of 50 grams of triethanolammonium dodecylbenzenesulfonate (60% solution) and 5 grams sodium sulfite in 2000 grams of water. The polymerization time is about four hours; the final specific gravity is 1.089 at 20°/4°; and the catalyst requirement (2% potassium persulfate, 0.2% 2-anthraquinone sodium sulfonate) is 45 to 55 ml. Chlorine analyzed 40.8% (Schoniger flask method) vs. 42.4%

A chloroprene/2,3 - dichloro - 1,3 - butadiene-methyl methacrylate terpolymer grafted with poly (methyl meththeoretical.

EXAMPLE 10

A chloroprene/2,3 - dichloro - 1,3 - butadiene/methyl methacrylate terpolymer grafted with poly (methyl methacrylate) side chains and containing overall ratio of 1.6 parts chloroprene to 5 parts 2,3-dichloro-1,3-butadiene to 3.4 parts methyl methacrylate is prepared according to the procedure given in Example 1 by emulsifying 160 grams of chloroprene, 500 grams of 2,3-dichloro-1,3-butadiene, 240 grams of methyl methacrylate and 4.65 grams of dodecyl mercaptan with a solution of 50 grams of triethanolammonium dodecylbenzenesulfonate (60% solution) and 5 grams of sodium sulfite in 2000 grams of water. The polymerization time is 4 hours and the final gravity is 1.078 at 20°/4° C.

EXAMPLE 11

A chloroprene/2,3 - dichloro - 1,3 - butadiene/butyl methacrylate terpolymer grafted with poly (butyl methacrylate) side chains and containing an overall ratio of 1 part chloroprene to 2 parts 2,3-dichloro-1,3-butadiene to 1 part butyl methacrylate is prepared according to the procedure given in Example 1 by emulsifying 250 grams of chloroprene, 500 grams of 2,3-dichloro-1,3-butadiene, 250 grams of butyl methacrylate and 4.65 grams of dodecyl mercaptan with a solution of 50 grams of triethanolammonium dodecylbenzenesulfonate and 5 grams of sodium sulfite in 2000 grams of water. The polymerization time is 4 hours and the final gravity is 1.070 at 20°/4° C. Chlorine analysis is 38.5% (Schoniger flask method )vs. 38.7% theoretical.

EXAMPLE 12

A chloroprene-methyl methacrylate copolymer grafted with poly (methyl methacrylate) side chains and containing an overall ratio of 1 chloroprene/10.1 methyl methacrylate by weight is prepared according to the procedure given in Example 1 by emulsifying 45 grams of chloroprene, 455 grams methyl methacrylate and 1.85 grams of dodecyl mercaptan with a solution of 15 grams of triethanolammonium dodecylbenzenesulfonate and 1.5 grams of sodium sulfite in 550 grams of water. The polymerization requires 21 ml. of catalyst (1% aqueous potassium persulfate) and is complete in 3 hours 45 minutes. The product is isolated by coagulation with methanol. The dried polymer contains 3.7% chlorine (theory=3.6% Cl.).

Vinyl-to-steel adhesive test procedure

The following formulation is compounded on a rubber mill at 50° C.

| | Parts |
|---|---|
| Test polymer (as shown in Table III) | 100 |
| 2,2'-methylenebis(4-methyl-6-t-butylphenol) | 2 |
| Magnesium oxide, rubber grade | 4 |
| Zinc oxide, rubber grade | 5 |

The adhesive solution mix is prepared by ball milling 111 parts of the mill mix with 604 parts by weight of a solvent composed of equal volumes of methyl ethyl ketone and toluene; 0.5 part water; and 40 parts oil-soluble phenolic resin, until a smooth cement is obtained.

Two coats of the adhesive are applied to fabric-backed polyvinyl chloride plastic sheet containing 48% dioctyl phthalate (based on vinyl polymer), and to cold-rolled t-butyl phenolic resin, until a smooth cement is obtained. steel which has been wiped with trichloroethylene. A 15–30 minute drying period is allowed between the two coats. Fifteen to 30 minutes after applying the second coat of adhesive, the vinyl sheet is bonded to the steel using an approximately 1½" wide steel hand roller to provide bonding pressure. After aging, as indicated below, the 180° peel strength is measured on a Scott tester operated at a separation rate of 2" per minute.

The average strength per linear inch (p.l.i.) of bonded surface is given in Table III below:

TABLE III

| Bond aging (days) at room temp. | Peel strength (p.l.i.) at room temp. | | |
|---|---|---|---|
| | Polymer 1 [1] | Polymer 2 [2] | Polymer 3 [3] |
| 1 | 1 | [4] 2 | 3 |
| 3 | 3 | [4] 13 | 6 |
| 7 | 3 | [4] 17 | 8 |
| 14 | 2 | [4] 19 | 9 |

[1] Control, outside the scope of this invention. A fast crystallizing, mercaptan-modified chloroprene homopolymer, commercially used as a quick-setting adhesive.
[2] Grafted copolymer of Example 4.
[3] Control, outside the scope of this invention. A slow crystallizing copolymer of about 99.4 parts chloroprene and 0.6 parts methacrylic acid.
[4] Cohesive failure occurs, rather than adhesive failure.

The above data show the high bonding strength of a grafted copolymer of the present invention, as compared both with a chloroprene homopolymer and with a prior art chloroprene copolymer.

I claim:
1. A process for the preparation of a polymeric composition of matter consisting essentially of an addition random copolymer consisting essentially of a chloro-1,3-butadiene selected from the group consisting of 2-chloro-1,3-butadiene and 2,3-chloro-1,3-butadiene, with one other monomer or monomers of the formula

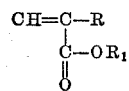

where R is an unbranched alkyl radical having 1–4 carbon atoms, and $R_1$ is an alkyl or cycloalkyl radical having 1–12 carbon atoms, with additional units of said formula monomer grafted onto the copolymer backbone of said addition random copolymer to a total formula monomer content in the product of 15 to 80% by weight, the ratio of grafted formula monomer to copolymerized formula monomer being from 0.76 to 39; said process consisting essentially of:
 (1) in an inert atmosphere, contacting and emulsifying in water 100 parts by weight of a said chloro-1,3-butadiene with about from 17.7 to 400 parts by weight of a said formula monomer or monomers in the presence of an anion of an anionic surface active agent together with approximately an equivalent amount of a cation selected from the group consisting of triethanolammonium, tri(2-propanol) ammonium, diethanolammonium, and a $C_1$–$C_3$ alkyldiethanolammonium, the total amount of said anion and cation being about 0.5 to 10.0 parts per 100 parts of monomers, while adding a polymerization catalyst;
 (2) maintaining the components in emulsion at a temperature of about from 10 to 60° C., whereby the said formula monomer randomly copolymerizes with the said 2-chloro-1,3-butadiene until substantially all of the latter is exhausted to form a copolymer backbone and thereafter residual formula monomer graft-polymerizes onto said copolymer backbone, and
 (3) continuing the graft copolymerization until the total formula monomer content of the product is 15 to 80% by weight.

2. A process of claim 1 wherein the formula monomer is methyl methacrylate.
3. A process of claim 1 wherein the formula monomer is butyl methacrylate.
4. A process of claim 1 wherein the cation is added as a salt of an inorganic or lower carboxylic acid, and the anion is added as an anionic surface active agent in association with some other cation.
5. A process of claim 1 wherein the specified cation and the anion are added in association with each other in one and the same surface active agent.
6. A process of claim 5 wherein the proportion of the surface active agent is about 1–5 parts by weight per 100 parts of the total initial monomer.
7. A process of claim 1 in which the monomer used as the starting material with the formula monomer is 2-chloro-1,3-butadiene.
8. A process of claim 1 in which the monomer used as the starting material with the formula monomer is 2,3-dichloro-1,3-butadiene.
9. A process of claim 1 in which the monomer used as the starting material with the formula monomer is a mixture of 2-chloro-1,3-butadiene and 2,3-dichloro-1,3-butadiene.
10. A polymeric composition of matter consisting essentially of (A) an addition random copolymer consisting essentially of about 100 parts by weight of a chloro-1,3-butadiene selected from the group consisting of 2-chloro-1,3-butadiene and 2,3-dichloro-1,3-butadiene with about from 10 to 50 parts by weight of one other monomer or monomers of the formula

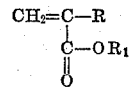

where R is an unbranched alkyl radical having 1–4 carbon atoms and $R_1$ is an alkyl or cycloalkyl radical having 1–12 carbon atoms, with (B) additional polymeric units of said formula monomer grafted onto the copolymeric backbone of said addition random copolymer to a total formula monomer content in the product of 15 to 80% by weight, the ratio of grafted formula monomer to copolymerized formula monomer being from 0.76 to 39, said polymeric composition of matter being produced by a process of claim 1.
11. A composition of claim 14 in which the monomer used as the starting material with the formula monomer is 2-chloro-1,3-butadiene.
12. A composition of claim 14 in which the monomer used as the starting material with the formula monomer is 2,3-dichloro-1,3-butadiene.
13. A composition of claim 14 in which the monomer used as the starting material with the formula monomer is a mixture of 2-chloro-1,3-butadiene and 2,3-dichloro-1,3-butadiene.
14. In the process of bonding a plasticized polyvinyl chloride article to steel by applying an adhesive between the polyvinyl chloride and steel surfaces, the improvement of using as the adhesive an adhesive comprising a composition of claim 10 in which the formula monomer is methyl methacrylate and is present in the proportion of 20 to 70% by weight and the proportion of chloro-1,3-butadiene is 30 to 80% by weight.

References Cited
UNITED STATES PATENTS

| 2,404,268 | 7/1946 | Barnes | 260—86.3 |
| 3,310,544 | 3/1967 | Alto | 260—86.3 |
| 3,468,833 | 9/1969 | Meincke | 260—879 |
| 3,471,591 | 10/1969 | Lindsey | 260—879 |

HARRY WONG, Jr., Primary Examiner

U.S. Cl. X.R.

117—128.4, 132, 138.8, 161; 161—218; 260—31.2 R, 32.8 R, 33.6 UA, 33.8 UA, 80.81, 86.3, 879 R, 890